United States Patent [19]

Angus, Jr. et al.

[11] Patent Number: 5,061,809

[45] Date of Patent: Oct. 29, 1991

[54] 9,9-BIS-(3,4-DICARBOXYPHENYL)FLUORENE DIANHYDRIDES

[75] Inventors: Richard O. Angus, Jr.; Khalil Yacoub, both of Allentown, Pa.

[73] Assignee: Air Products and Chemicals, Inc., Allentown, Pa.

[21] Appl. No.: 633,929

[22] Filed: Dec. 26, 1990

Related U.S. Application Data

[63] Continuation-in-part of Ser. No. 529,078, May 25, 1990, Pat. No. 5,009,679.

[51] Int. Cl.$^5$ .......................................... C07D 307/60
[52] U.S. Cl. ..................................... 549/233; 549/231
[58] Field of Search ........................ 549/233, 231, 232

[56] References Cited

U.S. PATENT DOCUMENTS

| | | | |
|---|---|---|---|
| Re. 30,351 | 7/1980 | Hoehn et al. | 55/16 |
| 3,522,160 | 7/1970 | Schenck et al. | 549/231 |
| 3,822,202 | 7/1974 | Hoehn | 210/23 |
| 3,899,309 | 8/1975 | Hoehn et al. | 29/16 |
| 4,263,209 | 4/1981 | Woo | 549/231 |
| 4,378,400 | 3/1983 | Makino et al. | 428/220 |
| 4,705,540 | 11/1987 | Hayes | 55/16 |
| 4,717,393 | 1/1988 | Hayes | 55/16 |
| 4,717,394 | 1/1988 | Hayes | 55/16 |

FOREIGN PATENT DOCUMENTS 63-190607 1/1987 Japan.

OTHER PUBLICATIONS

Kim, et al., "Reverse Permselectivity" of $N_2$ over $CH_4$ in Aromatic Polyimides, J. Appl. Poly. Sci., vol. 34, (1987), pp. 1767-1771.

Salame, "Prediction of Gas Barrier Properties of High Polymers," Polymer Eng. & Sci., vol. 26, (1986), pp. 1543-1546, No. 22.

Primary Examiner—C. Warren Ivy
Assistant Examiner—Raymond Covington
Attorney, Agent, or Firm—Keith D. Gourley; James C. Simmons; William F. Marsh

[57] ABSTRACT

The present invention relates to compositions of matter corresponding to the formula:

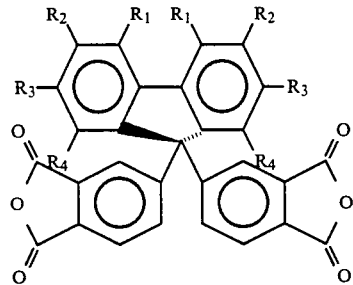

wherein $R_1$ through $R_4$, inclusive, are independently selected from a hydrogen atom, a linear or branched alkyl or alkoxy group having from 1 to about 8 carbon atoms, an alkenyl group having from 2 to about 8 carbon atoms, amino, cyano or $R_1$ and $R_1$, $R_1$ and $R_2$, $R_2$ and $R_3$ or $R_3$ and $R_4$ may together form part of a cyclohydrocarbyl ring. The subject 9,9-bis(3,4-dicarboxyphenyl)fluorene dianhydrides demonstrate utility as reactants in the preparation of polyimides used in the fabrication of membranes for separating gaseous mixtures into their respective components.

19 Claims, No Drawings

9,9-BIS-(3,4-DICARBOXYPHENYL)FLUORENE DIANHYDRIDES

RELATED APPLICATION

This application is a continuation-in-part of patent application Ser. No. 529,078, filed on May 25, 1990, the specification which is incorporated by reference and made a part of this application now U.S. Pat. No. 5,009,679.

TECHNICAL FIELD OF THE INVENTION

The present invention relates to 9,9-bis-(3,4-dicarboxyphenyl)-fluorene dianhydrides which demonstrate utility as intermediates in the preparation of polyimide polymers which can be fabricated into semi-permeable membranes for separating gaseous mixtures into their respective components.

BACKGROUND OF THE INVENTION

Dianhydrides find use as intermediates in the preparation of polymeric materials used in a multitude of applications. Considerable attention has been focused recently on the preparation of various polymers such as polyimides and polyamides which can be fabricated into selectively permeable membranes for use in separating gaseous mixtures into their respective components. These polymers are typically prepared by polycondensation of a dianhydride and the corresponding phenylenediamine.

U.S. Pat. Nos. 3,822,202 and 3,899,309 (reissued as Re. 30,351), disclose various polyimides, polyesters and polyamides which are fabricated into semi-permeable membranes for separating various fluids into their respective components. The repeating units of the main polymer chain comprising these polymers have at least one rigid divalent subunit, the two main chain single bonds extending therefrom which are not colinear wherein at least one of the subunits is sterically unable to rotate 360° around such bond. The repeating units also have 50 percent or more of its main chain atoms as members of aromatic rings.

U.S. Pat. No. 4,705,540 discloses highly permeable aromatic polyimide gas separation membranes formed from an aromatic polyimide in which the phenylenediamine groups are rigid and are substituted on essentially all of the positions ortho to the amine functionality and the acid anhydride groups are essentially all attached to rigid aromatic moieties.

U.S. Pat. Nos. 4,717,393 and 4,717,394 disclose polymeric membranes for separating components of a gaseous mixture wherein the membranes are semi-flexible, aromatic polyimides prepared by polycondensation of dianhydrides with phenylenediamines having alkyl substituents on all positions ortho to the amine functionality, or with mixtures of other non-alkylated diamines, some which possess substituents on all positions ortho to the amine functionality. The membranes formed from this class of polyimides are stated to exhibit improved environmental stability and gas permeability.

U.S. Pat. No. 4,378,400 discloses gas separation membranes formed from aromatic polyimides based upon biphenyltetracarboxylic dianhydride for separating various gas mixtures.

A need in the art exists for novel dianhydrides which can be incorporated into polymers for use in applications including, but not limited to, the separation of gaseous mixtures into their respective components.

BRIEF SUMMARY OF THE INVENTION

The present invention comprises novel compositions of matter, namely, 9,9-bis-(3,4-dicarboxyphenyl)fluorene dianhydrides represented by the formula:

The present invention relates to compositions of matter corresponding to the formula:

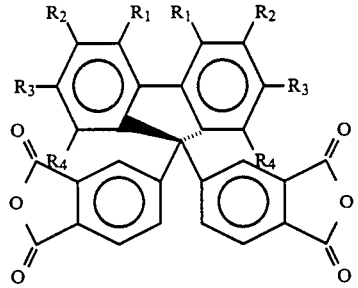

wherein $R_1$ through $R_4$, inclusive, are independently selected from a hydrogen atom, a linear or branched alkyl or alkoxy group having from 1 to about 8 carbon atoms, a linear or branched alkenyl group having from 2 to about 8 carbon atoms, amino, cyano or $R_1$ and $R_1$, $R_1$ and $R_2$, $R_2$ and $R_3$ or $R_3$ and $R_4$ may together from part of a cyclohydrocarbyl ring.

The subject dianhydrides of the present invention can be reacted with various aromatic diamines to form polymers for use in fabricating membranes which exhibit high gas perm-selectivity and are useful in gas separation applications, especially in the separation of oxygen and nitrogen from air.

DETAILED DESCRIPTION OF THE INVENTION

The present invention relates to novel compositions of matter, namely, 9,9-bis-(3,4-dicarboxyphenyl)fluorene dianhydrides represented by the formula:

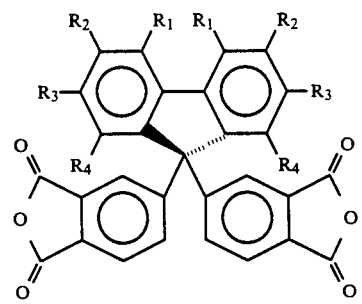

wherein $R_1$ through $R_4$, inclusive, are independently selected from a hydrogen atom, a linear or branched alkyl or alkoxy group having from 1 to about 8 carbon atoms, a linear or branched alkenyl group having from 2 to about 8 carbon atoms, amino, cyano or $R_1$ and $R_1$, $R_1$ and $R_2$, $R_2$ and $R_3$ or $R_3$ and $R_4$ may together from part of a cyclohydrocarbyl ring.

When reference is made to the term, cyclohydrocarbyl ring, such term shall be interpreted as referring to a polycyclic structure resulting from the cyclization of adjacent R groups according to formula I, more particularly, $R_1$ and $R_1$, $R_1$ and $R_2$, $R_2$ and $R_3$, or $R_3$ and $R_4$.

Preferably, $R_1$ through $R_4$, inclusive, are independently selected from a hydrogen atom, a linear or branched alkyl or alkoxy group having from about 1 to about 8 carbon atoms or a linear or branched alkenyl group having from 2 to about 8 carbon atoms. Most preferred is the structure according to formula I wherein $R_1$, $R_2$, $R_3$ and $R_4$ are hydrogen atoms.

As illustrated in formula I, a broad range of structures are disclosed wherein such compounds are made available via the preparative route disclosed in the present application. Suitable alkyl groups are linear and branched alkyls having from 1 to about 8 carbon atoms with the preferred alkyl groups being selected from methyl, ethyl, propyl, isopropyl, butyl, isobutyl or tert-butyl.

Suitable alkenyl groups are linear and branched alkenyl groups having from 2 to about 8 carbon atoms with the preferred alkenyl groups being selected from ethenyl, propenyl, isopropenyl, butenyl or isobutenyl.

Suitable alkoxy groups are linear and branched alkoxy groups having from 1 to about B carbon atoms with the preferred alkoxy groups being selected from methoxy, ethoxy, propoxy, isopropoxy, butoxy, sec-butoxy or tert-butoxy.

The 9,9-bis-(3,4-dicarboxyphenyl)fluorene dianhydrides of the present invention demonstrate utility as intermediates in the preparation of polyimide polymers which can be fabricated into semi-permeable membranes for separating gaseous mixtures into their respective components. More particularly, polymers formed from the polycondensation of the dianhydrides of the present invention and various aromatic diamines can be fabricated into membranes which demonstrate superior results in the recovery of oxygen from an $O_2/N_2$ stream or from air.

The structure of the aromatic diamines suitable for reaction with the subject dianhydrides of this invention and methods for making such membranes are disclosed in U.S. Pat. No. Ser. No. 529.078, filed on May 25, 1990, the specification which is incorporated by reference and made a part of this application.

The dianhydrides of the present invention are made in accordance with the following three step procedure:

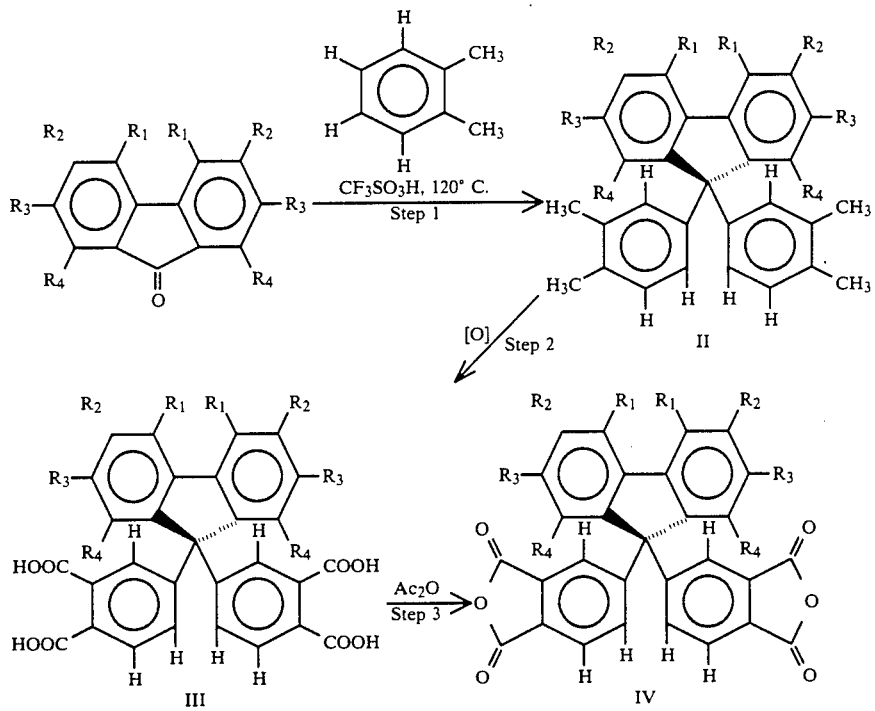

Step 1—reaction of the desired 9-fluorenone derivative with ortho-xylene to form the corresponding 9,9-bis(3,4-dimethylphenyl)-fluorene derivative (II).

Step 2—oxidation of the 9,9-bis-(3,4-dimethylphenyl)fluorene derivative to the corresponding 9,9-bis-(3,4-dicarboxyphenyl)fluorene derivative (III) and Step 3—cyclization of the 9,9-bis-(3,4-dicarboxyphenyl)fluorene derivative to the desired 9,9-bis-(3,4-dicarboxyphenyl)fluorene dianhydride (IV). Formation of the desired 9,9-bis(3,4-dimethylphenyl)-fluorene derivative (II) according to Step 1 is effected by reacting the desired 9-fluorenone derivative with ortho-xylene which also serves as the reaction solvent. Those skilled in the art will appreciate that various alternate ortho-dialkylbenzenes can be utilized in the present invention (i.e., ortho-diethylbenzene, ortho-dipropylbenzene and the like) whereby the reaction mechanism allows for formation of the product according to formula I. A reaction co-solvent may be utilized, although its use is not preferred. When such a co-solvent is utilized, care must be taken to avoid selecting a co-solvent which is capable of reacting with the fluorenones of the present invention.

The reaction according to step 1 is conducted under inert atmosphere (nitrogen, argon and the like) so as to avoid introduction of water into the reaction vessel. Typical reaction temperatures range from about 100° C. to the boiling point of the reactant/solvent with pressures ranging from atmospheric to about 10 atmospheres. Those skilled in the art will appreciate that reaction temperatures will be somewhat lower when $R_1$, $R_2$, $R_3$ or $R_4$ is an alkoxy group as compared to the reaction wherein $R_1$, $R_2$, $R_3$ or $R_4$ is a cyano group.

Referring to step 2 of the reaction scheme, any suitable oxidizing agent known in the art can be utilized to effect oxidation of the 9,9-bis-(3,4-dimethylphenyl)fluorene derivative to the corresponding 9,9-bis-(3,4-dicarboxyphenyl)fluorene derivative (III). Suitable reagents include $Co(OAc)_2 \cdot 4H_2O$, $Mn(OAc)_2 \cdot 4H_2O$ and NaBr. Reaction solvents can be selected from any simple alkyl organic acid such as butyric acid, pentanoic acid and the like with propionic acid being preferred due to the desirability of its boiling point. Typical reaction temperatures range from 100° C. to the boiling point of the reaction solvent. The resultant product is preferably purified by methods known in the art prior to conducting step 3 of the synthesis. For example, the product can be recrystallized from acetic acid to provide a white solid. Alternately, the reaction mixture can be added slowly to cold water to precipitate the diacid product.

The final step of the synthesis (step 3) comprises the cyclization of the 9,9-bis-(3,4-dicarboxyphenyl)fluorene derivative (III) to the desired 9,9-bis-(3,4-dicarboxyphenyl)fluorene dianhydride (IV). This step is readily achieved by merely heating the reaction mixture to a temperature ranging from about 120° C. to a temperature just below the melting point of the product for a period sufficient to effect the cyclization.

The following examples are provided to demonstrate the preparation of the aromatic dianhydrides of the present invention. The examples are illustrative and are not to be interpreted as limiting the scope of the claimed invention.

Preparation of 9,9-Bis-(3,4-dimethylohenyl)fluorene (II)

A three liter round-bottom flask fitted with a reflux condenser and a nitrogen gas inlet was charged with 9-fluorenone (36.6g, 201 mmol) and excess ortho-xylene (710 ml) and stirred under nitrogen atmosphere. Trifluoromethanesulfonic acid (30.0 g, 201 mmol) was slowly added to the solution causing the solution to turn brown/black. The reaction mixture was warmed to 120+/- 2° C. for 2 days. A small sample of the reaction mixture (0.5 mol) was removed, neutralized with saturated aqueous $NaHCO_3$ and the organic layer was spotted on a silica TLC plate and eluted with hexanes.

Chromatographic results demonstrated complete conversion of the starting materials and the development of a new single fluorescing spot. The entire reaction mixture was neutralized with saturated aqueous $NaHCO_3$, diluted with ethyl acetate (730 ml) decolorized with activated carbon, dried with magnesium sulfate and concentrated to a pale yellow powder. The product was triturated with ethanol and ethyl acetate to afford 50g (66%) of crude beige product, mp 168-70° C., which was sufficiently pure for the next step. IR (KBr) 3065w, 3042w, 3020w, 2970w, 2960s, 2945w, 2880vw, 1610vw, 1502m, 1475w, 1448s, 1384w, 1022w, 827w, 812w, 742+/- 2 $cm^{-1}$.

Alternate Preparation of 9,9-Bis-(3,4-dimethylohenyl)fluorene (II)

A three-liter round bottom indented flask fitted with a reflux condenser, nitrogen inlet and two-blade mechanical stirring paddle was filled with toluene (1000 ml), 9-fluorenone (143g, 796 mmol), phosphorous pentoxide (250g, 1760 mmol) and polyphosphoric acid (1000 g) and warmed to 115-120° C. for 50 h. The warm reaction mixture was slowly poured into 4 liters of crushed ice and allowed to warm to 20° C. The aqueous and organic layers were separated. The toluene layer was washed with water (200 ml) until neutral (approx. four times) dried over magnesium sulfate and concentrated to a viscous liquid which was dissolved in warm glacial acetic acid, decolorized with activated carbon powder and recrystallized to give about 165 g (60%) of white product, mp. 170° C., which was sufficiently pure for the next step.

Preparation of 9,9-Bis-(3,4-dicarboxyphenyl)fluorene (III)

To a 500 ml round-bottom flask equipped with a mechanical stirrer, reflux condenser and a nitrogen gas inlet, was added 9,9-bis-(3,4-dimethylphenyl)fluorene (1) (20.1 g, 53.7 mmol), $Co(OAc)_2 \cdot 4H_2O$ (1.07g. 4.29 mmol), $Mn(OAc)_2 \cdot 4H_2O$ (1.05g. 4.29 mmol). Na (536 mg, 5.20 mmol) and propionic acid (200 ml). Air was bubbled into the slurry at a rate of 0.2–0.5 L/min. The mix was stirred vigorously and warmed to 132+/- 2° C. for 2 days. TLC analysis of a small sample of the reaction mixture after neutralization and dilution with ethyl acetate showed the absence of starting material. Propionic acid was removed from the mixture at reduced pressure leaving a blue/white solid crude product in the flask which was sufficiently pure for the next synthetic step.

Preparation of 9,9-Bis-(3,4-dicarboxyphenyl)fluorene dianhydride (fl-DA) (IV)

The crude reaction mixture of 9,9-bis-(3,4-dicarboxyphenyl)fluorene (2) was heated to 150+/- 5° C. at 0.5 +/- 0.5 torr for 1 day. Infrared analysis of the crude reaction product was consistent with the dianhydride structure. The crude material was multiply recrystallized from toluene to afford a white powder, mp 267-69° C. IR (KBr) 3060w, 1890s, 1775s,1615w. 1445w, 1255s, 1108w, 895m, 733m, 688m +/- 5 $cm^{-1}$.

The present invention provides a novel class of aromatic dianhydrides which can be incorporated into polymers for use a broad range of applications including, but not limited to, the separation of gaseous mixtures into their respective components.

Having thus described the present invention, what is now deemed appropriate for Letters Patent is set out in the following appended claims.

What is claimed is:

1. A composition of matter having the structural formula:

The present invention relates to compositions of matter corresponding to the formula:

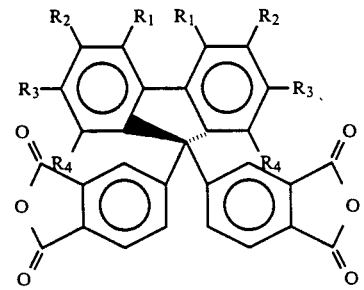

wherein $R_1$ through $R_4$, inclusive, are independently selected from a hydrogen atom, a linear or branched alkyl or alkoxy group having from 1 to about 8 carbon atoms, a linear or branched alkenyl group having from 2 to about 8 carbon atoms, amino, cyano or $R_1$ and $R_1$, $R_1$ and $R_2$, $R_2$ and $R_3$ and $R_3$ and $R_4$ may together form part of a cyclohydrocarbyl ring.

2. The composition of matter according to claim 1 wherein the alkyl group is selected from methyl, ethyl, propyl, isopropyl, butyl, isobutyl or tert-butyl.

3. The composition of matter according to claim 1 wherein the alkenyl group is selected from ethenyl, propenyl, isopropenyl, butenyl or isobutenyl.

4. The composition of matter according to claim 1 wherein the alkoxy group is selected from methoxy, ethoxy, propoxy, isopropoxy, butoxy, sec-butoxy or tert-butoxy.

5. A composition of matter having the structural formula:

The present invention relates to compositions of matter corresponding to the formula:

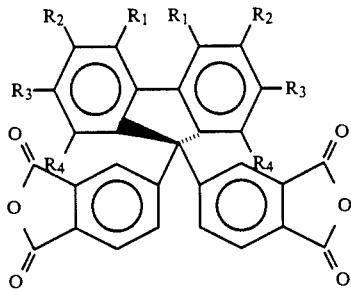

wherein $R_1$ through $R_4$, inclusive, are independently selected from a hydrogen atom, a linear or branched alkyl or alkoxy group having from 1 to about 8 carbon atoms, a linear or branched alkenyl group having from 2 to about 8 carbon atoms or $R_1$ and $R_1$, $R_1$ and $R_2$, $R_2$ and $R_3$ and $R_3$ and $R_4$ may together form part of a cyclohydrocarbyl ring.

6. The composition of matter according to claim 5 wherein the alkyl group is selected from methyl, ethyl, propyl, isopropyl, butyl, isobutyl and tert-butyl.

7. The composition of matter according to claim 5 wherein the alkenyl group is selected from ethenyl, propenyl, isopropenyl, butenyl and isobutenyl.

8. The composition of matter according to claim 5 wherein the alkoxy group is selected from methoxy, ethoxy, propoxy, isopropoxy, butoxy, sec-butoxy and tert-butoxy.

9. The composition of matter according to claim 6 wherein $R_1$ and $R_1$ together form part of a cyclohydrocarbyl ring.

10. The composition of matter according to claim 6 wherein $R_1$ and $R_2$ together form part of a cyclohydrocarbyl ring.

11. The composition of matter according to claim 6 wherein $R_2$ and $R_3$ together form part of a cyclohydrocarbyl ring.

12. The composition of matter according to claim 6 wherein $R_3$ and $R_4$ together form part of a cyclohydrocarbyl ring.

13. A composition of matter having the structural formula:

The present invention relates to compositions of matter corresponding to the formula:

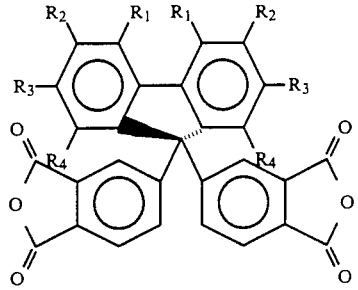

wherein $R_1$ through $R_4$, inclusive, are independently selected from a hydrogen atom, a linear or branched alkyl or alkoxy group having from 1 to about 8 carbon atoms or a linear or branched alkenyl group having from 2 to about 8 carbon atoms.

14. The composition of matter according to claim 13 wherein the alkyl group is selected from methyl, ethyl, propyl, isopropyl, butyl, isobutyl and tert-butyl.

15. The composition of matter according to claim 13 wherein the alkenyl group is selected from ethenyl, propenyl, isopropenyl, butenyl and isobutenyl.

16. The composition of matter according to claim 13 wherein the alkoxy group is selected from methoxy, ethoxy, propoxy, isopropoxy, butoxy, sec-butoxy and tert-butoxy.

17. The composition of matter according to claim 13 wherein $R_1$ through $R_4$ are independently selected from a hydrogen atom or a linear or branched alkyl having from 1 to about 8 carbon atoms.

18. The composition of matter according to claim 17 wherein the linear or branched alkyl is selected from methyl, ethyl, propyl, isopropyl, butyl, isobutyl and tert-butyl.

19. A composition of matter represented by the formula:

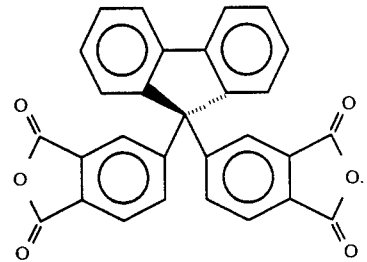

* * * * *

UNITED STATES PATENT AND TRADEMARK OFFICE
CERTIFICATE OF CORRECTION

PATENT NO. : 5,061,809

DATED : October 29, 1991

INVENTOR(S) : Angus, Jr., et al.

It is certified that error appears in the above-identified patent and that said Letters Patent is hereby corrected as shown below:

Column 2, line 29, delete "from" and insert -- form --.

Column 2, line 62, delete "from" and insert -- form --.

Column 3, line 50, delete "B" and insert -- 8 --.

Column 3, line 68, "529.078" should be -- 529,078 --.

Column 5, line 32, delete "9,9-Bis-(3,4-dimethylohenyl)fluorene" and insert -- 9,9-Bis-(3,4-dimethylphenyl)fluorene --.

Column 5, line 60, delete "9,9-Bis-(3,4-dimethylohenyl)fluorene" and insert -- 9,9-Bis-(3,4-dimethylphenyl)fluorene --.

Column 6, line 16, after "(1.05g. 4.29 mmol)" delete "." and insert -- , --.

Signed and Sealed this

Twenty-third Day of March, 1993

*Attest:*

STEPHEN G. KUNIN

*Attesting Officer*     *Acting Commissioner of Patents and Trademarks*